United States Patent [19]

Elston

[11] 3,984,610

[45] Oct. 5, 1976

[54] ETHYLENE POLYMERS WITH LONG CHAIN BRANCHING

[75] Inventor: Clayton Trevor Elston, Kingston, Canada

[73] Assignee: Du Pont of Canada Limited, Montreal, Canada

[22] Filed: Apr. 13, 1972

[21] Appl. No.: 243,867

[30] Foreign Application Priority Data
Apr. 16, 1971  Canada .............................. 110608

[52] U.S. Cl. .............................. 526/169; 526/280; 526/281; 526/336; 526/352
[51] Int. Cl.² .................... C08F 4/68; C08F 32/08; C08F 36/20
[58] Field of Search ................. 260/88.2 D, 88.2 E, 260/80.78; 526/169, 280, 281, 336

[56] References Cited
UNITED STATES PATENTS

| 2,933,480 | 4/1960 | Gresham et al. | 260/80.78 |
| 3,351,621 | 11/1967 | Bacskai | 260/88.2 |
| 3,467,637 | 9/1969 | Prucnal | 260/80.78 |

FOREIGN PATENTS OR APPLICATIONS

| 849,081 | 8/1970 | Canada |
| 1,195,625 | 6/1970 | United Kingdom |
| 1,081,626 | 8/1967 | United Kingdom |
| 863,373 | 3/1961 | United Kingdom |

OTHER PUBLICATIONS

Chemical Abstracts vol. 70, 78959 1969, *Vulcanizable Ethylene–Propylene–Cyclodiene Terpolymers.*

Volvassori et al., Chimica e Industria (Milan) 44 1095–1100 (Oct. 1962) (Translation furnished).

*Primary Examiner*—Edward J. Smith

[57] ABSTRACT

A polymer of an alpha-olefin and at least one diene with low residual unsaturation and long chain branching and the process for preparing said polymer. The process comprises polymerizing an alpha-olefin (ethylene) with at least one diene in the presence of a coordination catalyst, the diene being selected from linear $\alpha,\omega$-dienes of at least eight carbon atoms (1,7-octadiene) and cyclic endomethylenic dienes (bicyclo-(2,2,1)-2-5-heptadiene, dinorbornene), the diene being characterized in that each one of the two double bonds is readily polymerizable.

16 Claims, No Drawings

ETHYLENE POLYMERS WITH LONG CHAIN BRANCHING

BACKGROUND OF THE INVENTION

1. Field of the Invention

The present invention relates to the continuous polymerization of olefin polymers with long chain branching. In particular, the present invention relates to the continuous polymerization of ethylene and a diene to yield partly crystalline polymers containing long chain branching.

2. Prior Art

The coordination catalyst polymerization of polymers of ethylene and of copolymers of ethylene and mono-olefins is well known. Such polymers have many desirable physical properties and they have been used in a wide range of commercial applications especially as film and as moulded articles. However, it has been found that these polymers have rheological characteristics which result in process difficulties during the melt processing of these resins. One critical rheological deficiency is the low activation energy of viscous flow, i.e., the melt viscosity of the resin shows only relatively minor changes over the temperature range of 150°–300°C. normally used in commercial melt processing operations. Because of this low activation energy of viscous flow it may be necessary to use a polymer of lower molecular weight than is desirable in terms of the properties of the fabricated article in order to obtain the required degree of melt flow during the processing of the resin.

In the preparation of sulphur-curable polymers, ethylene may be polymerized with a diene. The preferred dienes have double bonds of unequal reactivity so that the polymer produced has residual unsaturation which may be subsequently used in the cross-linking of the resin. The preparation of such polymers is described in U.S. Pat. No. 2,933,480 which issued to W. F. Gresham and M. Hunt on Apr. 19, 1960 and U.S. Pat. No. 3,211,709 which issued to S. Adamek et al. on Oct. 12, 1965.

The preparation of cross-linkable polymers of ethylene and bicyclo-(2,2,1)-2,5-heptadiene is described in Canadian Pat. No. 607,108 which issued to G. S. Stamatoff on Oct. 18, 1960.

It is an object of the present invention to provide an olefin polymer with a higher activation energy of viscous flow.

It is a further object of this invention to provide an olefin polymer with a higher activation energy of viscous flow and having low residual carbon-carbon double bound unsaturation.

It has been found that the activation energy of viscous flow of polymers of ethylene may be increased by introducing long chain branching into the polymer. It has been found that the long chain branching in the polymer may be obtained by polymerizing ethylene with a non-conjugated diene in which the carbon-carbon double bonds are of essentially equal reactivity and capable of reaction with a coordination catalyst under the reaction conditions.

SUMMARY OF THE INVENTION

Accordingly the present invention provides a process for the preparation of a polymer with low residual unsaturation as hereinafter defined and long-chain branching which comprises polymerizing an alpha-olefin with at least one diene in the presence of a coordination catalyst, said diene being selected from the group consisting of linear α,ω-dienes of at least 8 carbon atoms and endomethylenic cyclic dienes, and said diene being characterized in that each one of the two double bonds is readily polymerizable.

The present invenion also provides a polymer with long-chain branching and low residual unsaturation.

The polymers of the present invention are copolymers of ethylene with a diene in which the diene is characterized by double bonds that are readily polymerizable. As is discussed hereinafter it is a feature of the present invention that the polymers produced have low residual unsaturation. Examples of the dienes that may be used are:

(a) linear α,ω-dienes of the type:

$CH_2=CH-(CH_2)_n-CH=CH_2$, where n is at least 4,     I (b) endomethylenic cyclic dienes of the type:

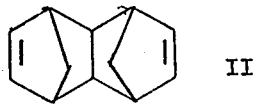 II
 III

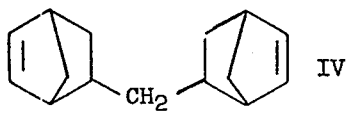 IV
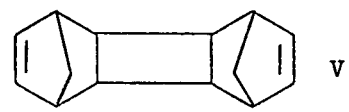 V

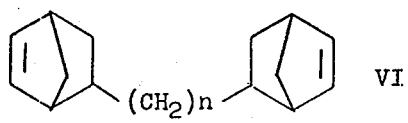 VI
 VII

The diene represented by formula II is hereinafter referred to as dinorbornene.

Conjugated dienes and dienes in which essentially only one of the double bonds is available for coordination polymerization such as for example in

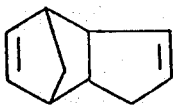

and $CH_3-CH=CH-CH_2-CH=CH_2$
are excluded from the present invention. These excluded dienes are of the type that may be used in the preparation of sulphur-curable resins where it is desirable to have residual unsaturation in the polymer, and where the preferred dienes have one double bond which is relatively unreactive under the polymer synthesis conditions.

The polymers of the present inventon are characterized not only by their modified physical properties but also by very low levels of residual unsaturation. In commercial practice the stability of polyethylene resins with regard to both colour and molecular weight changes during processing and end use service may be directly related to the residual unsaturation level of the polymer. For satisfactory polymer stability in melt processing operations the residual unsaturation level in the polymer preferably should be less than 0.08 carbon-carbon double bonds per 100 carbon atoms in the polymer and in particular less than 0.05 carbon-carbon double bonds per 100 carbon atoms. These unsaturation levels are substantially less than the preferred levels of unsaturation for vulcanizable resins. Such low levels of unsaturation in combination with long chain branching may be achieved by the process of the present invention. The term "low residual unsaturation" in the present application is defined as being less than 0.10 carbon-carbon double bonds per 100 carbon atoms.

Whenever used the polymers of the present invention are produced by the copolymerization of ethylene and a diene using a coordination catalyst. Preferably the polymers are produced under conditions that lead to homogeneous side chain distribution such as by the process described in Canadian Pat. No. 849,081 which issued to C. T. Elston on Aug. 11, 1970. Less efficient utilization and polymers of higher residual unsaturation may result when heterogeneous coordination catalysts, such as $R_3Al-VOCl_3$ where R is alkyl, are used.

In the preferred process the ethylene-diene long branched polymers are prepared by polymerizing the monomers in an inert solvent at a pressure sufficient to maintain the monomers in solution. The choice of the particular coordination catalyst system used may depend upon the degree of branching homogeneity desired and examples of suitable catalyst systems are $RAlCl_2 - VOCl_3$, $RAlCl^2 - VO(OR'_2)Cl$, $R_3Al_2Cl_3 - VOCl_3$ and $R_3Al_2Cl_3 - VO(OR'_2)Cl$ where R, R' are alkyl. A catalyst promoter such as N-alkyl trichloroacetamide, alkyl-4,4',4"-trichlorocrotonate and alkyl trichloroacetate may be added. Suitable mole ratios and concentrations of the catalyst components and promoter are promoter:aluminum ratios of not more than 0.6, aluminum:vanadium ratios of not less than 10, a vanadium concentration of not more than 0.175 millimoles/liter and a reactor temperature of less than 110°C.

The inert solvent used may be an aliphatic, aromatic or cycloaliphatic hydrocarbon such as hexane, toluene or cyclohexane. The preferred solvent is cyclohexane. The polymerization may be carried out in the presence of additional mono-olefins and/or hydrogen. Examples of such additional mono-olefin comonomers are propylene, butene-1, hexene-1, octene-1, norbornene and methyl norbornene.

In order that the coordination catalyst polymerized long branched polymers of the present invention may be clearly distinguished from the linear or short chain branched polymers which are well known in the art, the polymers may be characterized in terms of their activation energy of viscous flow ($E_A$). The polyethylenes of the prior art are characterized by $E_A$ values of about 5-7 kilocalories/mole while the polymers of the present invention may have $E_A$ values of more than 10, and preferably more than 12. The measurement of $E_A$ is described hereinafter.

The amount of diene required to obtain a polymer with the desired value of $E_A$ may be in the range 0.2-3.0 weight percent. The amount of diene required may depend on the melt index of the copolymer, the diene used and the conversion level of diene into long branches in the polymer.

It is an essential feature of the present invention that the conversion of the second double bond of the incorporated diene be at a high level so that the residual unsaturation is low. The reaction of the second bond in the diene may be described by the same form of kinetic polymerization rate equations as may be used to describe reactions of other polymerizable double bonds. Under a given set of reaction conditions the conversion of the second double bond may be related to the conversion of the double bond in ethylene. This relative activity ($\alpha$) may be defined as $$\alpha = \frac{Q_E/1 - Q_E}{Q_D/1 - Q_D}$$

where
$Q_E$ = fraction of ethylene converted to polymer
$Q_d$ = fraction of the second double bond of the diene converted to long branch.

When the diene contains bicycloheptene type double bonds the relative reactivity under the preferred reaction conditions of the present invention has been found to be about 2.6. In general it has been found that at the preferred levels of diene incorporation into the polymer it is necessary to maintain $Q_E$ at about 0.80 or higher and $Q_D$ at about 0.60 or higher in order to maintain the residual unsaturation in the polymer at an acceptably low level.

With linear $\alpha,\omega$-dienes such as 1,7-octadiene the value of $\alpha$ is found to be about 16. Thus, if $Q_D$ is maintained at a value of about 0.60 the value of $Q_E$ must be about 0.96 in order to obtain acceptably low levels of residual unsaturation in the polymer. Dienes may have a deleterious effect on the coordination catalyst efficiency and it may not be practical to operate an an ethylene conversion of 0.96. Therefore, the use of linear $\alpha,\omega$-dienes, such as 1,7-octadiene, is less preferred than the use in the process of the present invention of endomethylenic dienes in which both the carbon-carbon double bonds are located in a bicyclo-(2,2,1)-heptene or endomethylenic type ring system.

As described hereinabove it is essential that the conversion of the second double bond of the incorporated diene be at a high level so that residual unsaturation is low. This may be accomplished most readily if the two double bonds of the diene are of substantially equal reactivity. Thus it is preferred if the double bonds are both vinyl carbon-carbon double bonds as in 1,7- octadiene, or both endomethylenic double bonds as in bicyclic-(2,2,1)-2,5-heptadiene. However the process of the present invention may be operated with a diene containing one vinyl-type double bond and one endometylenic-type double bond; the low residual unsaturation may not be so readily attainable with dienes of this latter type. It is to be understood that the term "dienes" in the present invention may include dienes containing one vinyl-type double bond and one endomethylenic-type double bond.

The term "readily polymerizable" is used to define the reactivity of the diene double bonds under the reaction conditions of the present invention. It is described hereinabove that in a preferred embodiment the double bonds of the diene are of substantially equal reactivity. In addition it is essential that these double bonds be capable of being polymerized at a rate such that the desired amount of diene is incorporated into the polymer at economic polymerization rates. Dienes having this type of reactivity may be defined as being "readily polymerizable," and such dienes would typically have a reactivity equal to or greater than about one half that of octene-1 under the reaction conditions.

The present invention may be illustrated by the following examples.

EXAMPLE 1

Runs 1–10 of Table I were made using a well agitated continuous reactor system operating under essentially turbulent mixing conditions usch that an environment substantially free of concentration gradients was maintained in the reactor. Ethylene, the selected diene, the catalyst components and in some cases additional olefins and hydrogen were dissolved in the inert solvent and fed into the reactor. The reactor was maintained under pressure, usually about 1,200 psi and the contact time was varied. The process conditions and the results of these runs are tabulated in Table I.

Polymer properties referred to hereinafter in the Tables were determined by the following methods.

MELT INDEX

Polymer melt index is a measure of polymer melt viscosity and was determined using ASTM Method D1238.

COPOLYMER DENSITY

Copolymer density was determined by ASTM Method D1505-63T.

STRESS EXPONENT

The stress exponent is determined by measuring the throughput in a melt indexer at two stresses (2160 g. and 6480 g. loading) using the procedures of the ASTM melt index test method- $$S.E. = \frac{1}{0.477}(\log \frac{\text{wt. extruded with 6480 g. wt.}}{\text{wt. extruded with 2160 g. wt.}})$$

The stress exponent is an index of polymer molecular weight distribution. Narrow molecular weight distribution polymers are characterized by low stress exponent values of about 1.25 or less at a resin melt index of 1.0. The observed stress exponent value for a given polymer is a function of the polymer molecular weight or melt index and a comparison of stress exponent values between various resins should only be made at approximately equivalent melt index levels.

COPOLYMER ANALYSIS i. Bicyclo-(2,2,1)-2,-heptene

The copolymers were analyzed for bicycloheptene content from the infrared spectrophotometer absorbance at 1155 cm$^{-1}$ using a melt pressed film of 10–15 mil thickness. The weight per cent of bicycloheptene in the copolymer was calculated from the equation:

Wt. % bicycloheptene = 7.03$A$ where $$A = \frac{\text{Absorbance at 1155 cm}^{-1}}{\text{Film thickness (mils)} \times \text{density (gms/cc)}} \times 10^2$$

This equation was determined from relating infrared absorbance at 1155 cm$^{-1}$ to the weight percent bicyclo-(2,2,1)-2 heptene content as measured by radiochemical analysis of copolymers produced from $C_{14}$ tagged bicyclo-(2,2,1)-2 heptene.

ii. Bicyclo-(2,2,1)-5-Methyl-2-heptene

The copolymers prepared from this monomer were analyzed from the infrared spectrophotometric absorbance of the methyl group at 1378 cm$^{-1}$ using the ASTM method A-1 of D 2238-64T. $K'_{1378}$ for alkyl groups greater than $C_3$ was taken as 0.110 and the factor $f_{1378}$, obtained by calibration with cetane and with bicyclo-(2,2,1)-5-methyl-2-heptene were found to be 141.5 and 247.0 respectively.

iii. Alkyl Groups

The determination of total alkyl groups was made by the ASTM method "Tentative Method of Test for Alkyl Groups in Polyethylenes based on Infrared Spectrophotometry — Proposed Revision of D2238-64T" using method A-1 — Standard Sample Compensation Method. $K'_{1378}$ for alkyl groups greater than $C_3$ was taken to be 0.110:$K'_{1378}$ for ethyl groups was taken to be 0.074 and the factor $f_{1378}$, obtained by calibration with cetane, was determined to be 141.5. The total number of alkyl groups was determined and reported in terms of total methyl groups per 100 carbon atoms.

For short chain alkyl groups the number of side chain methyl groups also represents the number of branches and is related directly to the comonomer content of the copolymers.

iv. Carbon-Carbon Unsaturation

The concentration of vinyl, vinylidene and trans unsaturation groups in the copolymers was determined by infrared spectrophotometric absorbances at 908, 889 and 965 cm$^{-1}$ using molar extinction coefficients of 121.0, 103.4 and 85.4 respectively.

SOLUTION VISCOSITY

The inherent viscosity of the dilute polymer solutions (0.1 wt. % polymer in decalin) were determined at 125°C. using the procedure of ASTM D 1601-61.

INHERENT VISCOSITY RATIO

This quantity represents the ratio of the inherent viscosity of a standard linear ethylene polymer at a given melt index level to the inherent viscosity of the test polymer at the same melt index level.

ACTIVATION ENERGY OF VISCOUS FLOW

Values of activation energy ($E_A$) were calculated for the test polymers using the equation $$E_A = 22.4 \log \frac{(W_{190})}{(W_{150})}$$

Where
$W_{190}$ = wt. of polymer extruded in 10 minutes at 190°C. using standard melt index procedure as defined previously.
$W_{150}$ = as for $W_{190}$ except that an extrusion temperature of 150°C. was used.

Run 1 of Table I illustrates the synthesis of a typical ethylene homopolymer using a homogeneous coordination catalyst system. The activation energy of viscous flow of this homopolymer was low, namely 5.5 kilocalories/mole. Runs 2–3 of Table I show the effect of diene of structure II shown hereinbefore on the properties of the resulting polymer, raising the activation energy very substantially to a level of 11.3 kilocalories/mole. Because of their high activation energy the polymers of runs 2 and 3 are considerably more fluid at high temperatures, and therefore more processable, than polymers of equivalent molecular weight without the long branches introduced by the diene comonomer. These diene branched polymers have a low residual unsaturation level and showed excellent stability under melt processing conditions.

Runs 4–5 of Table I illustrate the synthesis of long branched polymers of high activation energy with other dienes. In run 5 with 1,7-octadiene it should be noted that a very high ethylene conversion was maintaine in order to obtain a satisfactorily high diene conversion.

Run 6 of Table I illustrates the preparation of a terpolymer containing both short and long side branches.

Run 7 of Table I illustrates the preparation of another terpolymer containing both short and long side branches. The high activation energy of this terpolymer is to be compared with the corresponding polymer of run 8 in which diene was not used.

Runs 9 and 10 of Table I further illustrate the effect of increased diene concentration on the polymer viscosity ratio and activation energy.

TABLE I

SYNTHESIS CONDITIONS OF LONG BRANCHED POLYMERS

| | 1 | 2 | 3 | 4 | 5 |
|---|---|---|---|---|---|
| Ethylene (gms/min) | 0.354 | 0.253 | 0.255 | 0.253 | 0.354 |
| Comonomers - olfin | — | — | — | — | — |
| Comonomers - (gms/min) | — | — | — | — | — |
| Comonomers - diene | — | II | II | VII | I |
| Comonomers - (gms/min) | — | 0.00174 | 0.00261 | 0.00858 | 0.00487 |
| Solvent (mls/min) | 17.09 | 15.55 | 15.14 | 15.72 | 19.23 |
| Hydrogen (micromoles/min) | — | 16.7 | 17.7 | 36.6 | 20.4 |
| Cocatalyst | (Ethyl)$_3$Al$_2$Cl$_3$ | (Ethyl)$_3$Al$_2$Cl$_3$ | (Ethyl)$_3$Al$_2$Cl$_3$ | (Ethyl)$_3$Al$_2$Cl$_3$ | (Ethyl)$_3$Al$_2$Cl$_3$ |
| Catalyst | VO(O-n-decyl)$_2$Cl | VO(O-n-decyl)$_2$Cl | VO(O-n-decyl)$_2$Cl | VO(O-n-decyl)$_2$Cl | VOCl$_3$ |
| Promoter | — | — | — | — | Cl$_3$CCOOC$_2$H$_5$ |
| Cocatalyst/catalyst ratio | 10.1 | 9.8 | 10.0 | 10.1 | 9.9 |
| Promoter/cocatalyst ratio | — | — | — | — | 0.20 |
| Catalyst conc. in reactor (millimoles/liter) | 0.150 | 0.166 | 0.168 | 0.163 | 0.110 |
| Reactor Temp. °C. | 100 | 100 | 100 | 100 | 100 |
| Reactor contact time (min.) | 3.94 | 4.32 | 4.88 | 4.28 | 3.51 |
| Ethylene conversion | 0.905 | 0.853 | 0.873 | 0.840 | 0.948 |
| Diene conversion | — | 0.708 | 0.742 | 0.688 | 0.533 |
| Polymer melt index | 2.76 | 2.65 | 1.44 | 2.10 | 1.50 |
| Polymer stress exponent | 1.33 | 1.34 | 1.56 | 1.43 | 1.62 |
| Polymer density | 0.951 | 0.950 | 0.950 | 0.9415 | 0.9495 |
| Polymer composition mono-olefin (wt. %) | — | — | — | — | — |
| Polymer composition diene (wt. %)* | — | 0.58 | 0.88 | 2.7 | 0.77 |
| Inherent solution viscosity | 1.45 | 1.04 | 1.04 | 0.83 | 0.96 |
| Inherent viscosity ratio | 1.0 | 1.40 | 1.57 | 1.84 | 1.68 |
| Activation energy (K cal/mole) | 5.5 | 10.0 | 11.3 | 13.3 | 11.0 |
| Residual unsaturation (c=c/100c) | <0.03 | <0.03 | <0.04 | 0.07 | 0.06 |

| | 6 | 7 | 8 | 9 | 10 |
|---|---|---|---|---|---|
| Ethylene (gms/min) | 0.354 | 0.253 | 0.253 | 0.354 | 0.353 |
| Comonomers - olefin | octene | 5-methylnorbornene | 5-methylnorbornene | Norbornene | Norbornene |
| Comonomers - (gms/min) | 0.1197 | 0.0244 | 0.0230 | 0.0164 | 0.0205 |
| Comonomers - diene | II | II | — | VII | VII |
| Comonomers - (gms/min) | 0.00157 | 0.00174 | — | 0.0117 | 0.00541 |
| Solvent (mls/min) | 19.47 | 16.11 | 15.16 | 19.61 | 19.51 |
| Hydrogen (micromoles/min) | — | 33.0 | 11.0 | 34.4 | 21.3 |
| Cocatalyst | (Ethyl)$_3$Al$_2$Cl$_3$ | (Ethyl)$_3$Al$_2$Cl$_3$ | (Ethyl)$_3$Al$_2$Cl$_3$ | (Ethyl)$_3$Al$_2$Cl$_3$ | (Ethyl)$_3$Al$_2$Cl$_3$ |
| Catalyst | VO(O-n-decyl)$_2$Cl | VO(O-n-decyl)$_2$Cl | VO(O-n-decyl)$_2$Cl | VOCl$_3$ | VOCl$_3$ |
| Promoter | Cl$_3$CCCl=CCl$_2$ | — | — | Cl$_3$COOC$_2$H$_5$ | Cl$_3$COOC$_2$H$_5$ |
| Cocatalyst/catalyst ratio | 14.2 | 10 | 9.9 | 10 | 10 |
| Promoter/cocatalyst ratio | 0.106 | — | — | 0.20 | 0.20 |
| Catalyst conc. in reactor | 0.127 | 0.118 | 0.127 | 0.0613 | 0.0615 |

TABLE I-continued

SYNTHESIS CONDITIONS OF LONG BRANCHED POLYMERS

| (millimoles/liter) | | | | | |
|---|---|---|---|---|---|
| Reactor Temp. °C. | 100 | 88 | 88 | 100 | 100 |
| Reactor contact time (min.) | 3.47 | 4.27 | 4.53 | 3.43 | 3.45 |
| Ethylene conversion | 0.831 | 0.818 | 0.859 | 0.902 | 0.903 |
| Diene conversion | 0.672 | 0.643 | — | — | — |
| Polymer melt index | 1.01 | 1.40 | 2.77 | 2.94 | 0.84 |
| Polymer stress exponent | 1.56 | 1.47 | 1.17 | 1.40 | 1.48 |
| Polymer density | 0.9250 | 0.9370 | 0.9320 | 0.938 | 0.935 |
| Polymer composition mono-olefin (wt. %) | 9.9 | 7.1 | 7.1 | 3.7 | 4.9 |
| Polymer composition diene (wt. %)* | 0.33 | 0.50 | — | 2.7 | 1.3 |
| Inherent solution viscosity | 1.34 | 1.04 | — | 0.93 | 1.46 |
| Inherent viscosity ratio | 1.30 | 1.42 | — | 1.54 | 1.22 |
| Activation energy (K cal/mole) | 10.1 | 11.5 | 7.9 | 11.5 | 10.3 |
| Residual Unsaturation (c=c/100c) | <0.03 | <0.05 | <0.02 | <0.04 | <0.03 |

*calculated from diene reactivity data

The polymers of the invention have utility in the preparation of films and molded goods. The high activation energy level of the polymers of this invention permit a greater change in melt viscosity with temperature changes. For many extrusion and melt fabrication operations this large change in viscosity with temperature results in improved processability of the polymers of the invention and permits better balance of physical properties to be attained. In addition, the polymers of this invention because of their long chain branching achieve improved bubble stability in blowing film in the tubular process for the preparation of film.

What is claim is:

1. A normally solid, melt-fabricable, partially crystalline thermoplastic polymer of ethylene characterized by having low residual unsaturation, by having long chain branches homogenously distributed along the main macromolecular chains, and by an activation energy of viscous flow in the molten state of greater than 10 kilocalories per mole, said long-chain branches being attached to the main macromolecular chains at branch points consisting of copolymerized unconjugated dienes selected from the group consisting of linear α,ω-dienes of at least 8 carbon atoms in length and cyclic endomethylenic dienes containing at least one norbornene nucleus, said copolymerized unconjugated diene branch points being present in the polymer of ehtylene at a level of from 0.2 to 3.0% by weight.

2. The polymer of claim 1 wherein the carbon-carbon double bond unsaturation is less than 0.05.

3. The polymer of claim 1 wherein the activation energy is more than 12.

4. The polymer of claim 1 wherein the diene is $CH_2=CH-(CH_2)_4-CH=CH_2$.

5. The polymer of claim 1 wherein the diene is

6. The polymer of claim 1 wherein the diene is dinorbornene.

7. The polymer of ethylene of claim 1 wherein short-chain branches derived from an additional copolymerized monoolefin are present.

8. The polymer of ethylene of claim 7 wherein the additional monoolefin is 1-octene.

9. The polymer of ethylene of claim 7 wherein the additional monoolefin is 1-butene.

10. In a continuous process for polymerizing ethylene under conditions that lead to homogeneous side-chain distribution in the presence of a hydrocarbon solvent with a coordination catalyst to produce high molecular weight, partially crystalline, thermoplastic polymers of ethylene having low residual unsaturation and long-chain branches, the improvement which comprises introducing homogenously distributed long-chain branches into the polymer of ethylene by employing as the coordination catalyst a homogeneous catalyst obtained from the reaction, at an Al/V ratio not less than about 10, of an alkyl aluminum chloride with a vanadium oxy-chloride compound selected from the group consisting of $VOCl_3$ and $VO(OR')2Cl$, where R' is an alkyl group, continuously feeding to an agitated polymerization zone a monomer feed comprising ethylene and a second feed comprising an unconjugated diene in which the two double bonds are of substantially equal reactivity to polymerization, said diene being selected from the group consisting of linear α,ω-dienes containing at least 8 carbon atoms and cyclic endomethylenic dienes containing at least one norbornene nucleus, said ethylene monomer feed and said diene feed being fed to the polymerization zone as a solution in the inert hydrocarbon medium, the ratio of diene to ethylene feeds being adjusted to provide 0.2 to 3% copolymerized diene in the polymer of ethylene.

11. The process of claim 10 wherein the diene is 1,7-octadiene.

12. The process of claim 10 wherein the diene is bicyclo(2,2,1)-2,5-heptadiene.

13. The process of claim 10 wherein the diene is dinorbornene.

14. The process of claim 10 wherein a minor proportion of an additional monoolefin is fed to the polymerization zone along with ethylene.

15. The process of claim 14 wherein the additional monoolefin is 1-butene.

16. The process of claim 14 wherein the additional monoolefin is 1-octene.

* * * * *

UNITED STATES PATENT OFFICE
CERTIFICATE OF CORRECTION

PATENT NO. : 3,984,610
DATED : October 5, 1976
INVENTOR(S) : Clayton Trevor Elston It is certified that error appears in the above-identified patent and that said Letters Patent are hereby corrected as shown below:

Column 9, line 33, "claim" should read --claimed--.

Column 9, line 49, "ehtylene" should read --ethylene--.

Signed and Sealed this

Eighth Day of February 1977

[SEAL]

Attest:

RUTH C. MASON
Attesting Officer

C. MARSHALL DANN
Commissioner of Patents and Trademarks